United States Patent [19]

Inui et al.

[11] Patent Number: 5,362,794
[45] Date of Patent: Nov. 8, 1994

[54] RUBBER COMPOSITION HAVING EXCELLENT GRIPPING POWER AND ROLLING RESISTANCE, AND PRODUCTION THEREOF

[75] Inventors: Naoki Inui, Yamatokoriyama; Kazuaki Yamamoto, Toyonaka; Hideo Nagasaki, Osaka; Manji Sasaki, Nishinomiya; Shinichi Yachigo, Toyonaka, all of Japan

[73] Assignee: Sumitomo Chemical Company, Ltd., Osaka, Japan

[21] Appl. No.: 89,521

[22] Filed: Jul. 21, 1993

[51] Int. Cl.$^5$ .............................. C08K 3/02
[52] U.S. Cl. .................. 624/496; 152/209 R; 524/190; 525/376; 525/382
[58] Field of Search .............. 525/376, 382; 524/190, 524/495, 496; 152/209 R; 534/886

[56] References Cited

U.S. PATENT DOCUMENTS

| | | | |
|---|---|---|---|
| 3,017,406 | 1/1962 | Mehr | 534/886 |
| 4,118,367 | 10/1978 | Dawes et al. | 534/886 |
| 4,129,531 | 12/1978 | Rauer et al. | 525/376 |
| 4,255,536 | 3/1981 | Udipi | 525/376 |
| 4,550,142 | 10/1985 | Akita et al. | 525/382 |
| 4,914,147 | 4/1990 | Mouri et al. | 524/495 |
| 4,960,832 | 10/1990 | Arnold et al. | 525/376 |
| 4,963,615 | 10/1990 | Yuto | 524/495 |

FOREIGN PATENT DOCUMENTS

| | | |
|---|---|---|
| 722666 | 11/1965 | Canada . |
| 3920175 | 12/1989 | Germany . |
| 59-197443 | 11/1984 | Japan . |
| 60-8341 | 1/1985 | Japan . |
| 60-8342 | 1/1985 | Japan . |
| 63-308011 | 12/1988 | Japan . |
| 613317 | 11/1946 | United Kingdom . |

OTHER PUBLICATIONS

Database WPI; Section Ch, Week 9034, Derwent Publications Ltd., London, GB; Class A, AN 90–258391; & JP-A-2 182 737 (Bridgestone Tire KK) 17 Jul. 1990; abstract.
Database WPI; Section Ch, Week 8451, Derwent Publications Ltd., London, GB; Class A, AN 84–315395; & JP-A-59 197 443 (Nippon Zeon KK) 9 Nov. 1984; abstract.
A STM Standard D1765–91a.

*Primary Examiner*—Veronica P. Hoke
*Attorney, Agent, or Firm*—Wenderoth, Lind & Ponack

[57] ABSTRACT

A rubber composition comprising the following components:
(A) a rubber component comprising at least 50% by weight of a styrene/butadiene copolymer rubber;
(B) an azodicarboxylic ester compound represented by the formula $$X-\underset{\underset{O}{\|}}{O}C-N=N-\underset{\underset{O}{\|}}{C}O-X \qquad (I)$$

wherein X is an alkyl of 3 to 8 carbon atoms, an unsubstituted or substituted phenyl, or an unsubstituted or substituted benzyl;
(C) carbon black having a nitrogen absorption specific surface area of 100 to 250 m$^2$/g and a dibutyl phthalate absorption number of 110 to 170 ml/100 g;
(D) sulfur; and
(E) a benzothiazole vulcanization accelerator.

This rubber composition shows a high loss factor (tan δ) in a low temperature range, and a low loss factor in a high temperature range which when applied to the production of automobile tires, achieves improved braking power on wet, snow covered or frozen road surfaces. Lowered rolling resistance during driving without loss in the strength characteristics of the composition are also exhibited.

13 Claims, No Drawings

RUBBER COMPOSITION HAVING EXCELLENT GRIPPING POWER AND ROLLING RESISTANCE, AND PRODUCTION THEREOF

This invention relates to a rubber composition suited for tires, in particular, to a rubber composition exhibiting excellent wet-gripping property, ice-gripping property and low rolling resistance. The invention also relates to a process for producing the same.

In the field of automobiles, such factors as running stability and braking capability, in particular, braking capability on a wet road surface and on a road covered with snow or ice have become increasingly important in recent years, as well as the lowering of fuel consumption to save resources and energy. Because of this, demands for rubber materials for use in tires have been ever more severe.

Basic properties required for such rubber materials to be used for tires are as follows:

(1) to have a certain level of hardness due to the necessity for carrying huge static loads, and also to be excellent in failure characteristics, such as resistance to flexural fatigue, durability and abrasion resistance, against external forces repeatedly applied for a prolonged period of time;

(2) to have low rolling resistance required for lowered fuel consumption, more specifically, to have a small loss factor (tan δ) determined by a dynamic viscoelasticity test of vulcanized rubber with a frequency of 10 to 100 Hz at a temperature range of 50° to 80° C.; and (3) to be excellent in braking capability on a wet road surface (wet-gripping property) and in braking capability on a road surface covered with snow or ice (ice-gripping property), more specifically, to have a large loss factor (tan δ) determined by the dynamic viscoelasticity test of vulcanized rubber and measured with a frequency of 10 to 100 Hz at a temperature range of −20° to +30° C.

Of the above properties, the rolling resistance of item (2) and the wet- and ice-gripping properties of item (3) are said to be physical properties caused by the hysteresis loss of the rubber. That is to say, the rolling resistance of a tire corresponds to the energy dissipation of the tire upon driving where the rubber is subjected to a periodic deformation of relatively low frequency. In order to lower the rolling resistance, the hysteresis loss of the rubber composition must be decreased. On the other hand, the wet-gripping property and ice-gripping property correspond to energy dissipation upon braking when the rubber is subjected to a periodic high-frequency deformation formed between the tire tread and the fine irregularities on the road surface. In order to improve the wet- and ice-gripping properties, the hysteresis loss of the rubber composition must be increased. Therefore, it has been thought that the above two physical properties are contradictory.

However, the frequency of periodic deformation to which the tire is subjected at the time of driving is greatly different from that which it is subjected to at the time of braking. It is known that, when the deformation frequency is converted into a temperature in accordance with the Williams-Landel-Ferry's temperature conversion equation and the dynamic viscoelasticity test is carried out with a determination frequency of 10 to 100 Hz, the rolling resistance has a good correlation with the loss factor (tan δ: an index for hysteresis loss) in a temperature range of 50° to 80° C., the wet-gripping property with tan δ in the range of 0° to 30° C., and the ice-gripping property with tan δ in the range of −20° to 0° C., respectively. It would therefore be understood that low rolling resistance, high wet-gripping property and high ice-gripping property can be satisfied simultaneously if the value of tan δ could be made larger in the low-temperature range of −20° to +30° C. and the value of tan δ could be made smaller in the high-temperature range of 50° to 80° C.

The hitherto proposed techniques for satisfying such requirements for tread rubber materials included, for example, one in which a polybutadiene rubber or a styrene/butadiene copolymer rubber having a high 1,2-structure content in butadiene units and obtainable by solution polymerization is used as a base rubber; one in which a plurality of rubbers having different glass transition temperatures are blended; one in which a polybutadiene rubber or a styrene/butadiene copolymer rubber having a tin-carbon linkage contained in the molecular chain, or a polybutadiene rubber or a styrene/butadiene copolymer rubber having a polymer chain added with amino group-containing benzophenones, lactams or ureas is used as a base rubber; and one in which modified carbon black or a modifier is compounded.

It has been practiced to apply such modified rubbers or modified carbon black to rubbers to be used for tires. However, such modified rubbers and modified carbon black have a serious problem concerning the safety of tires in that, although they reduce to a certain extent the fuel consumption, their low-temperature properties (such as ice-gripping property and wet-gripping property) are still not sufficient, or rather their low-temperature properties are deteriorated by the lowering of fuel consumption. It has therefore been desired to improve the two contradicting properties (fuel consumption and low-temperature property) at the same time, while maintaining the strength of the rubber.

In view of the above, the present inventors have conducted intensive investigations to develop a rubber composition which has sufficiently high tan δ at a temperature range of −20° to +30° C. to improve the braking capability of tires on a wet road surface and on a snow-covered or frozen road surface (wet-gripping property and ice-gripping property) and besides has low tan δ at a temperature range of 50° C. to 80° C., thereby balancing the low-temperature property and the rolling resistance. This invention has been accomplished as a result of the investigations.

This invention provides a rubber composition which comprises:

(A) 100 parts by weight of a rubber component comprising at least 50% by weight of a styrene/butadiene copolymer rubber;

(B) 1 to 6 parts by weight of an azodicarboxylic ester compound represented by the formula (I):

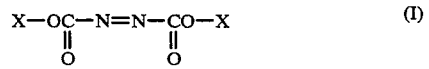

wherein X is an alkyl of 3 to 8 carbon atoms, an unsubstituted or substituted phenyl, or an unsubstituted or substituted benzyl;

(C) 60 to 250 parts by weight of carbon black having a nitrogen absorption specific surface area of 100 to 250 m²/g and a dibutyl phthalate absorption number of 110 to 170 ml/100 g;
(D) 0.5 to 4 parts by weight of sulfur; and
(E) 0.3 to 3 parts by weight of a benzothiazole vulcanization accelerator;
said components (B) through (E) being incorporated into said rubber component in a rubber processing machine.

Upon production of the composition, it is preferred to blend the rubber component (A) at first with the azodicarboxylic ester compound (B) and carbon black (C) at a high temperature, followed by the addition of the sulfur (D) and the vulcanization accelerator (E) at a low temperature. Accordingly, this invention also provides a process for producing a rubber composition which comprises:

blending, by using a rubber processing machine, (A) 100 parts by weight of a rubber component comprising at least 50% by weight of a styrene/butadiene copolymer rubber at a rubber temperature of 50° to 190° C. with (B) 1 to 6 parts by weight of the azodicarboxylic ester compound represented by the above formula (I) and (C) 60 to 250 parts by weight of carbon black having a nitrogen absorption specific surface area of 100 to 250 m²/g and a dibutyl phthalate absorption number of 110 to 170 ml/100 g;
blending the resulting mixture at a rubber temperature of 10° to 120° C. with (D) 0.5 to 4 parts by weight of sulfur, and (E) 0.3 to 3 parts by weight of a benzothiazole vulcanization accelerator; and
vulcanizing the resulting mixture.

Further, this invention provides a method for increasing a loss factor of a vulcanized rubber in a low temperature range of −20° to +30° C. as well as lowering the loss factor of the vulcanized rubber at a high temperature range of 50° to 80° C., said loss factor being determined by a dynamic viscoelasticity test with a frequency of 10 to 100 Hz, said method comprising:

blending, in a rubber processing step, (A) 100 parts by weight of a rubber component comprising at least 50% by weight of a styrene/butadiene copolymer rubber at a rubber temperature of 50° to 190° C. with (B) 1 to 6 parts by weight of an azodicarboxylic ester compound represented by the above formula (I) and (C) 60 to 250 parts by weight of carbon black having a nitrogen absorption specific surface area of 100 to 250 m²/g and a dibutyl phthalate absorption number of 110 to 170 ml/100 g;
blending the resulting mixture at a rubber temperature of 10° to 120° C. with (D) 0.5 to 4 parts by weight of sulfur, and (E) 0.3 to 3 parts by weight of a benzothiazole vulcanization accelerator; and
vulcanizing the resulting mixture.

A major portion of the rubber component to be used in the invention is a styrene/butadiene copolymer prepared by copolymerizing styrene and butadiene. The styrene/butadiene copolymer may be prepared by either solution polymerization or emulsion polymerization. It is preferred to use a styrene/butadiene copolymer rubber containing 10 to 50% by weight of a styrene unit and containing 20 to 80% by weight of a 1,2-structure in a butadiene unit. When butadiene is (co)polymerized, some part bonds at a 1,2-position, and another part at a 1,4-position. The term "1,2-structure" herein means a polymerization unit derived from butadiene and bonded at the 1,2-position. Of the ordinary styrene/butadiene copolymer rubbers, those having a high styrene unit content, in particular, those containing 30 to 50% by weight of the styrene unit are more preferred.

Other examples of preferred styrene/butadiene copolymer rubbers include those modified by introducing an amino group-containing benzophenone compound into the terminals of the copolymer molecules, as well as those coupled with tin or silicon. The amino group-containing benzophenone compound which can be introduced into the terminals of the copolymer molecules is preferably represented by the formula (II):

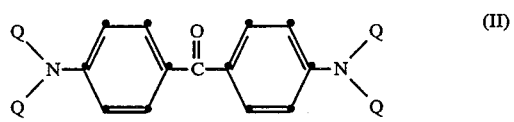

wherein Q is methyl or ethyl.

The styrene/butadiene copolymer rubbers modified with the benzophenone or coupled with tin or silicon, preferably have the following characteristics:

(A1) a styrene unit of 10 to 30% by weight and a butadiene unit of 90 to 70% by weight;
(A2) a 1,2-structure of 20 to 80% by weight in the butadiene unit; and
(A3) a Mooney viscosity value of 30 to 80 indicated by $ML_{1+4}(100°\ C.)$.

These styrene/butatiene copolymer rubbers modified with the benzophenone compound or coupled with tin or silicon are capable of exhibiting excellent low rolling resistance and wet- and ice-gripping properties, in particular, when the azodicarboxylic ester of the formula (I) is incorporated. In the styrene/butadiene copolymer rubbers coupled with tin, branched copolymers having a tin-butadienyl bond can be contained preferably in an amount of 30% by weight or more.

The styrene/butadiene copolymer rubbers modified with the benzophenone compound can be produced by a known method, as described, for example, in Japanese Patent Kokai (Laid Open) Nos. 197,443/84, 8,341/85 and 8,342/85. More specifically, styrene may be copolymerized with butadiene by means of solution polymerization in a hydrocarbon solvent and using an organic lithium compound as a polymerization initiator (so-called living polymerization process), and the resulting copolymer may be reacted with the benzophenone compound represented by the above formula (II) to produce the modified styrene/butadiene copolymer rubber. Considering economic aspects and side reactions, it is preferred that the copolymerization be carried out at a temperature of about 0° to about 150° C., although the polymerization temperature may be varied depending on the desired microstructure. The content of the 1,2-structure in the butadiene unit can be controlled, for example, by using a Lewis base such as ethers or tertiary amines and changing the kind and quantity thereof, or by selecting appropriate polymerization conditions including the polymerization temperature.

Specific examples of the benzophenone compound represented by the formula (II) to be used in the modification include 4,4'-bis(dimethylamino)benzophenone and 4,4'-bis(diethylamino)benzophenone. The benzophenone compound is used preferably in an amount of about 0.2 to about 1.5 equivalents, per equivalent weight of the lithium atoms at the polymerization terminals. It can be effective, with regard to failure characteristics and rolling resistance, to allow a part of the polymerization terminals to react with a coupling compound, such as tin tetrachloride, before reacting with the benzophenone compound of the formula (II), so that branched copolymers be contained. In cases where such a branched copolymer is formed, the coupling compound, such as tin tetrachloride, must be used in a quantity not deteriorating the effects of the modification with the benzophenone compound, and is usually used in an amount of about 0.01 to about 0.2 equivalent, per equivalent weight of lithium atoms at the polymerization terminals.

The styrene/butadiene copolymer rubber coupled with tin or silicon can be produced by a known method as described, for example, in Japanese Patent Kokai (Laid Open) No. 308,011/88. To be more specific, styrene may be copolymerized with butadiene by means of solution polymerization in a hydrocarbon solvent and using an organic lithium compound as a polymerization initiator, to give a copolymer having a butadienyl-lithium bond at a polymerization terminal, which is then subjected to a coupling reaction with a halogenated tin compound or a halogenated silicon compound to produce the desired copolymer rubber. It can be preferred to add a small quantity of butadiene at the end of the copolymerization, so as to form the butadienyl-lithium bond.

Examples of compounds to be used for the coupling reaction include halogenated tin compounds, such as tin tetrachloride, phenyltin trichloride and tributyltin chloride, and halogenated silicon compounds, such as silicon tetrachloride. The use of silicon tetrachloride is particularly preferred. The content of the 1,2-structure in the butadiene unit can be controlled by using a Lewis base, such as ethers or tertiary amines, and changing the kind and quantity thereof, or by selecting appropriate polymerization conditions including a polymerization temperature. It is preferred, considering economic aspects and side reactions, that the copolymerization be carried out at a temperature of about 0° to about 150° C., although the polymerization temperature may be varied depending on the desired microstructure. The halogenated tin compound or halogenated silicon compound is used for the coupling reaction preferably in an amount of about 0.08 to about 0.5 equivalent, per equivalent weight of lithium atoms at the polymerization terminals.

In the case of solution polymerized styrene/butadiene copolymer rubbers, it is also possible to use those whose molecules are modified with a modifier, including ureas, such as tetramethyl urea and tetraethylurea, and amino group-containing unsaturated compounds, such as N-(N',N'-dimethylaminopropyl)acrylamide.

The rubber component according to the invention mainly comprises the styrene/butadiene copolymer, as has been explained hereinabove. The copolymer can be used either alone or in the form of a blend containing the copolymer in an amount of 50% by weight or more and another rubber in an amount of up to 50% by weight. Examples of the other rubbers to be blendable include natural rubber and various kinds of synthetic rubbers, such as polyisoprene rubber (IR), polybutadiene rubber (BR), acryloritrile/butadiene copolymer rubber (NBR), isoprene/isobutylene copolymer rubber (IIR), and ethylene/propylene/diene copolymer rubber (EPDM). The use of diene rubbers is preferred, in particular, natural rubber, polyisoprene rubber, polybutadiene rubber, and the like. In the case of blending another rubber, it is preferred that the other rubber be blended in an amount of 5% by weight or more, based on the total weight of the rubber component. Accordingly, in a blending system, the styrene/butadiene copolymer rubber is preferably blended in an amount of 50 to 95% by weight, and another rubber in an amount of 50 to 5% by weight.

In the invention, it is preferred to use the styrene/butadiene copolymer alone, or to use a mixture mainly comprising the styrene/butadiene copolymer and blended with natural rubber, polyisoprene rubber and/or polybutadiene rubber.

The azodicarboxylic ester compound of the component (B) represented by the formula (I) can be synthesized, for example, by reacting hydrazine with a corresponding chloroformic ester in an aqueous solution and in the presence of a base, such as sodium carbonate or potassium carbonate, to give a hydrazodiformate, and then oxidizing the hydrazodiformate by the use of an oxidant, such as fuming nitric acid, chlorine or bromine.

In the formula (I), X is an alkyl of 3 to 8 carbon atoms, an unsubstituted or substituted phenyl, or an unsubstituted or substituted benzyl.

Examples of the alkyl denoted by X include n-propyl, isopropyl, n-butyl, isobutyl, sec-butyl, tert-butyl, pentyl, hexyl, octyl, and the like. These alkyls can be, of course, straight-chained, and besides they can also be branched or cyclic. Of these groups, acyclic alkyls of 3 to 5 carbon atoms and, in particular, branched alkyls are preferred.

The phenyl denoted by X can be either unsubstituted or substituted. In the latter case, it may have such substituent as an alkyl of 1 to 8 carbon atoms, an alkoxy of 1 to 8 carbon atoms, an alkanoyl of 2 to 9 total carbon atoms, an N,N-dialkylamino, nitro, cyano, carboxyl, halogen, or the like. The alkyl contained in the N,N-dialkylamino may have 1 to 6 carbon atoms. Examples of the halogen include fluorine, chlorine, bromine and iodine. In the case where the phenyl has a substituent, the substituent may be situated at any of the ortho-, meta- and para-positions. Examples of the preferred phenyl include unsubstituted phenyl, p-nitrophenyl, p-methylphenyl, and the like.

The benzyl denoted by X can also be either unsubstituted or substituted. A substituent for the benzyl can be an alkyl of 1 to 8 carbon atoms, an alkoxy of 1 to 8 carbon atoms, an alkanoyl of 2 to 9 total carbon atoms, an N,N-dialkylamino, nitro, cyano, carboxyl, halogen, or the like. The alkyl contained in the N,N-dialkylamino may have 1 to 6 carbon atoms. Examples of the halogen include fluorine, chlorine, bromine and iodine. When the benzyl has a substituent, the position of the substituent may be any of ortho-, meta- and para-positions. Examples of the preferred benzyl include unsubstituted benzyl, p-nitrobenzyl, p-methylbenzyl, and the like.

Representative azodicarboxylic ester compounds of the formula (I) usable in the invention are as follows, but they are given for the purpose of illustration and not limitation.

(1) Di-n-propyl azodicarboxylate
(2) Diisopropyl azodicarboxylate
(3) Di-n-butyl azodicarboxylate
(4) Diisobutyl azodicarboxylate
(5) Di-tert-butyl azodicarboxylate
(6) Dihexyl azodicarboxylate
(7) Dioctyl azodicarboxylate (8) Diphenyl azodicarboxylate
(9) Bis(p-nitrophenyl) azodicarboxylate
(10) Bis(p-methylphenyl) azodicarboxylate
(11) Bis(p-bromophenyl) azodicarboxylate
(12) Bis(p-chlorophenyl) azodicarboxylate
(13) Bis[p-(N,N-dimethylamino)phenyl] azodicarboxylate
(14) Dibenzyl azodicarboxylate
(15) Bis(p-nitrobenzyl) azodicarboxylate
(16) Bis(p-methylbenzyl) azodicarboxylate
(17) Bis(p-bromobenzyl) azodicarboxylate
(18) Bis(p-chlorobenzyl) azodicarboxylate
(19) Bis[p-(N,N-dimethylamino)benzyl] azodicarboxylate The azodicarboxylic ester compound of the formula (I) can be added to rubber either individually or in the form of a mixture of two or more of the compounds. It is also possible to add the compound in the form of a mixture with a carrier such as clay which exerts no adverse effects on the properties of the rubber. The azodicarboxylic ester compound can be incorporated in an amount of from 1 to 6 parts by weight, per 100 parts by weight of the rubber. When the amount is less than 1 part by weight, it will not be possible to attain a sufficiently improved effect, whereas when it exceeds 6 parts by weight, the resulting rubber will exhibit a marked decrease in reinforcement, for example, undesirable lowering in tensile strength, cross-linking density and abrasion resistance. In addition, the effect on lowering the rolling resistance tends to be lessened.

The component (c) used in the invention is carbon black having a nitrogen absorption specific surface area (hereinafter referred to as "$N_2SA$") of from 100 to 250 $m^2/g$ and a dibutyl phthalate absorption number (hereinafter referred to "DBP absorption number") of 110 to 170 ml/100 g. An $N_2SA$ of less than 100 $m^2/g$ will result in a deterioration of the wet-gripping property and the ice-gripping property, whereas an $N_2SA$ of greater than 250 $m^2/g$ will result in an inferior heat build-up resistance, and in no improvement of rolling resistance. When the DBP absorption number is less than 110 ml/100 g, inferior wet- and ice-gripping properties will be attained, whereas when it exceeds 170 ml/100 g, deteriorations in abrasion resistance and rolling resistance will be observed.

The carbon black is incorporated in an amount of 60 to 250 parts by weight, or preferably from about 60 to about 150 parts by weight. When the amount of the carbon black incorporated is less than 60 parts by weight, an inferior reinforcement of the rubber will be attained and wet- and ice-gripping properties will not be sufficiently improved, whereas when it is greater than 250 parts by weight, results in undesirable lowering of the heat build-up resistance and blow out resistance will be observed.

In the invention, any sulfur generally employed in the rubber industry can be used as the component (D). From the viewpoints of the heat resistance, tensile strength and abrasion resistance of the rubber, the sulfur is incorporated in an amount of 0.5 to 4 parts by weight, per 100 parts by weight of the rubber.

As the benzothiazole vulcanization accelerator of the component (E), various compounds having a benzothiazole nucleus can be used. Specific examples of usable benzothiazole vulcanization accelerators include 2-mercaptobenzothiazole, dibenzothiazyl disulfide, N-cyclohexyl-2-benzothiazylsulfenamide, N-tert-butyl-2-benzothiazylsulfenamide, N,N-dicyclohexyl-2-benzothiazylsulfenamide, N-oxydiethylene-2-benzothiazylsulfenamide, and the like. From the viewpoints of heat resistance, abrasion resistance, tensile strength and flex cracking resistance, the benzothiazole vulcanization accelerator is used in an amount of 0.3 to 3 parts by weight, per 100 parts by weight of the rubber.

Upon compounding rubber materials for tire treads, process oils have often been used to improve the gripping performance of tires. In this invention, too, the use of a process oil is admissible and advantageous. Though there is no particular restriction on the amount of the process oil to be blended, it is, in general, used in an amount not greater than 100 parts by weight, and preferably in an amount of 5 to 100 parts by weight, per 100 parts by weight of the rubber. There is also no particular restriction on the kind of the process oil to be used, and any process oils which have hitherto been employed in the rubber industry can also be used in the invention.

It is a matter of course that various other chemicals which have hitherto been employed in the rubber industry can also be used in the invention, as occasion demands, and such chemicals include, for example, antioxidants, retarders, peptizers, softeners, petroleum resins, and the like.

There is no particular restriction on the method used to produce the rubber composition of the invention, but each of the components is blended by using a rubber processing machine. The rubber processing machine herein means a roll-type or closed-type kneading machine which is conventionally used in rubber compounding. Examples of usable closed-type kneading machines include Bambury mixers, kneaders, intermixes, and the like. The rubber component and other ingredients are directly kneaded in such a rubber processing machine.

Upon compounding the components, it is possible to adopt a method in which the rubber component (A) is at first blended and kneaded with the azodicarboxylic ester compound of the component (B), and thereafter the carbon black of the component (C) is added to the resulting mixture, followed by the compounding of the sulfur of the component (D) and the vulcanization accelerator of the component (E). In this case, the azodicarboxylic ester is added to the rubber component at a relatively low temperature, for example, at a rubber temperature of around 40° to 100° C., and after kneading, the carbon black is added at a temperature higher than the above temperature, for example, at a rubber temperature of around 100° to 180° C. After kneading, the resulting mixture is then cooled to a rubber temperature of around 40° to 100° C., followed by adding the sulfur and the vulcanization accelerator.

However, in order to achieve the effects of the invention more advantageously, it is preferred to adopt a method in which the azodicarboxylic ester compound and the carbon black are added at first to the rubber component, and after kneading the resulting mixture for about 0.5 to 30 minutes, the sulfur and the vulcanization accelerator are added thereto, followed by vulcanization. Such a two-step blending process is a simple and convenient manner and exhibits an improvement in the ice-gripping and wet-gripping properties, as well as lowering in the rolling resistance. In the case where such a two-step compounding is employed, the addition of the azodicarboxylic ester compound and carbon black is carried out usually at a rubber temperature in the range of 50° to 190° C., preferably 50° to 120° C. On the other hand, the addition of the sulfur and vulcanization accelerator is carried out usually at a rubber temperature in the range of 10° to 120° C., preferably 10° to 70° C. It is preferred that the sulfur and the vulcanization accelerator are added to the rubber at a temperature not higher than that at which the preceding addition of the azodicarboxylic ester compound and the carbon black is carried out.

The thus compounded rubber composition according to the invention can be advantageously used, e.g., in various parts of tires, in particular, in a tread. For example, the rubber composition can be applied to the tread or other parts of tires, shaped according to a method conventionally employed in the tire industry and then subjected to vulcanization, to produce the tires. The vulcanization is preferably carried out at a temperature range of approximately 80° to 180° C.

This invention will further be explained in detail by way of examples. It should, however, be understood that the invention is by no means limited by the examples. In the following examples, percentages and parts denoting amounts or contents are based on weight unless otherwise specifically noted. The following is a list of azodicarboxylic ester compounds used in the examples and their symbols.

A: Diisopropyl azodicarboxylate
B: Di-tert-butyl azodicarboxylate
C: Diisobutyl azodicarboxylate
D: Diphenyl azodicarboxylate
E: Bis(p-nitrophenyl) azodicarboxylate
F: Dibenzyl azodicarboxylate

EXAMPLE 1

| [Compounding Formulation] | Parts |
| --- | --- |
| Styrene/butadiene copolymer rubber prepared by emulsion polymerization (having a styrene unit content of 35% and a 1,2-structure content of 25% in a butadiene unit and containing 37.5 parts of aromatic oil per 100 parts of the rubber) | 137.5 |
| ISAF carbon black (N220) (having an $N_2SA$ of 125 $m^2/g$ and a DBP absorption number of 130 ml/100 g) | 80 |
| Stearic acid | 3 |
| Zinc oxide | 5 |
| Aromatic process oil | 12.5 |
| Antioxidant (N-phenyl-N'-1,3-dimethylbutyl-p-phenylenediamine) | 2 |
| Vulcanization accelerator (N-cyclohexyl-2-benzothiazylsulfenamide) | 1 |
| Sulfur | 2 |
| Azodicarboxylic ester | Shown in Table 1 |

The rubber component shown in the above formulation was charged into an open mill. While maintaining its temperature at 40° to 50° C., the azodicarboxylic ester shown in Table 1 was added thereto, and the mixture was kneaded for 5 minutes. The resulting rubber blend was transferred into a 250 ml Laboplastomill (a type of Bambury mixer) manufactured by Toyo Seiki Co. At an oil bath temperature of 170° C., the carbon black, stearic acid, process oil, antioxidant and zinc oxide shown in the formulation were charged into the mill, and the mixture was kneaded for 5 minutes at a mixer revolution of 50 rpm, during which the rubber temperature was 160° to 170° C. The rubber blend was then transferred into the open mill, and the vulcanization accelerator and the sulfur were added at a temperature of 40° to 50° C. After kneading, the resulting rubber composition was vulcanized at 170° C. by use of a vulcanization press, formed into a predetermined shape and then subjected to the following tests. A control sample, in which the azodicarboxylic acid was not used, was also prepared, starting from the kneading in the Bambury mixer.

Determination of tan δ

Tan δ was determined at temperatures in the range of from −50° C. to +100° C. under conditions of an initial static strain of 10%, a dynamic strain amplitude of 0.25% and a frequency of 10 Hz, using a viscoelasticity spectrometer manufactured by Iwamoto Seisakusho Co.

Tensile Test according to JIS K 6301

Test pieces (dumbbell No. 3) of vulcanized rubbers were prepared from the above rubber compositions. The test pieces were subjected to a tensile test at a room temperature to determine tensile stress ($M_{100}$, $M_{300}$ and $M_{500}$). Of the test results obtained, tan δ at 0° C., 20° C., 40° C. and 60° C. and $M_{100}$, $M_{300}$ and $M_{500}$ are shown in Table 1, together with the kinds and quantity of the azodicarboxylic ester used.

TABLE 1

(Results of Example 1)

| | Run No. | Invention | | | | | | | Control Sample for Comparison |
| --- | --- | --- | --- | --- | --- | --- | --- | --- | --- |
| | | 1 | 2 | 3 | 4 | 5 | 6 | 7 | 8 |
| Azodicarboxylic Ester | Kind | A | A | B | C | D | E | F | — |
| | Amount (parts) | 2 | 5 | 5 | 5 | 5 | 5 | 5 | — |
| Tan δ | 0° C. | 0.389 | 0.424 | 0.461 | 0.353 | 0.322 | 0.330 | 0.356 | 0.299 |
| | 20° C. | 0.231 | 0.245 | 0.252 | 0.233 | 0.228 | 0.228 | 0.230 | 0.222 |
| | 40° C. | 0.220 | 0.230 | 0.224 | 0.220 | 0.219 | 0.218 | 0.218 | 0.212 |
| | 60° C. | 0.195 | 0.189 | 0.190 | 0.193 | 0.192 | 0.193 | 0.192 | 0.199 |
| Tensile Stress ($kgf/cm^2$) | $M_{100}$ | 17 | 16 | 19 | 17 | 17 | 16 | 16 | 16 |
| | $M_{300}$ | 72 | 70 | 95 | 72 | 70 | 71 | 70 | 73 |
| | $M_{500}$ | 149 | 147 | 185 | 145 | 158 | 143 | 144 | 151 |

EXAMPLE 2

| [Compounding Formulation] | Parts |
| --- | --- |
| Styrene/butadiene copolymer rubber prepared by solution polymerization (having | 144 |

-continued

| [Compounding Formulation] | Parts |
|---|---|
| a styrene unit content of 40% and a 1,2-structure content of 49% in a butadiene unit, and containing 44 parts of aromatic oil per 100 parts of the rubber) | |
| SAF crbon black (N110) (having an N$_2$SA of 140 m$^2$/g and a DBP absorption number of 132 ml/100 g) | 100 |
| Stearic acid | 3 |
| Zinc oxide | 5 |
| Aromatic process oil | 50 |
| Vulcanization accelerator (N-cyclohexyl-2-benzothiazylsulfenamide) | 1 |
| Sulfur | 2 |
| Azodicarboxylic ester | Shown in Table 2 |

The procedure of Example 1 was repeated, except that the formulation was changed to the above. The results are shown in Table 2. In this case, however, it was not possible to determine M$_{500}$ since the test pieces were broken before reaching an elongation rate of 500% in the tensile test.

TABLE 2

(Results of Example 2)

| | | Invention | | | | Control Sample for Comparison |
|---|---|---|---|---|---|---|
| Run No. | | 1 | 2 | 3 | 4 | 5 |
| Azodi-carboxylic Ester | Kind | A | B | C | F | — |
| | Amount (parts) | 5 | 5 | 5 | 5 | — |
| Tan δ | 0° C. | 0.501 | 0.514 | 0.489 | 0.469 | 0.367 |
| | 20° C. | 0.316 | 0.334 | 0.328 | 0.334 | 0.298 |
| | 40° C. | 0.297 | 0.301 | 0.294 | 0.291 | 0.287 |
| | 60° C. | 0.248 | 0.251 | 0.253 | 0.253 | 0.260 |
| Tensile Stress (kgf/cm$^2$) | M$_{100}$ | 27 | 26 | 25 | 26 | 29 |
| | M$_{300}$ | 63 | 64 | 61 | 63 | 67 |

EXAMPLE 3

(1) Synthesis of Benzophenone-modified Styrene/-Butadiene Copolymer Rubber (SBR-1)

Under a nitrogen atmosphere, cyclohexane, 1,3-butadiene, tetrahydrofuran and styrene are charged into a reactor equipped with a stirrer and a jacket. After a temperature is adjusted to 30° C., n-butyl lithium is added to start polymerization. After the temperature is raised to 70° C., polymerization is carried out for 2 hours, so as to allow the polymerization conversion rate to reach 100%. A small quantity of tin tetrachloride is then added, and a coupling reaction is allowed to proceed at 70° C. for 15 minutes. Thereafter, 4,4'-bis(diethylamino)benzophenone is added, and a modification reaction is allowed to proceed at 60° C. for 30 minutes. To a copolymer solution obtained in such a way 2,6-di-tert-butyl-p-cresol is added, and then the solvent is removed by means of steam stripping. The resulting product is then dried on a heat roll of 110° C. to obtain a modified copolymer. The content of a styrene unit in the thus obtained copolymer and the content of a 1,2-structure in a butadiene unit are determined by using an infrared spectrophotometer.

A modified styrene/butadiene copolymer rubber (SBR-1) having a styrene unit content of 24%, a 1,2-structure content of 34% in a butadiene unit and a Mooney viscosity of 45 ML$_{1+4}$(100° C.) was prepared in accordance with the above procedure.

(2) Production and Tests of Rubber Composition

| [Compounding Formulation] | Parts |
|---|---|
| Styrene/butadiene copolymer rubber (SBR-1) | 100 |
| HAF-HS carbon black (having an N$_2$NA of 104 m$^2$/g and a DBP absorption number of 124 ml/100 g) | 60 |
| Stearic acid | 3 |
| Zinc oxide | 2 |
| Antioxidant (N-phenyl-N'-1,3-dimethylbutyl-p-phenylenediamine) | 2 |
| Vulcanization accelerator (N-cyclohexyl-2-benzothiazylsulfenamide) | 1 |
| Sulfur | 2 |
| Azodicarboxylic ester | Shown in Table 3 |

According to the above formulation, the styrene/-butadiene copolymer rubber, azodicarboxylic ester, carbon black, stearic acid, zinc oxide and antioxidant were charged into a 250 ml Laboplastomill (a Bambury mixer manufactured by Toyo Seiki Co.), and the contents were kneaded for 5 minutes at an oil bath temperature of 120° C., with a mixer revolution of 50 rpm. During the kneading, the temperature of the contents was 105° to 117° C. The resulting rubber blend was transferred into an open mill, and it was mixed and kneaded with the vulcanization accelerator and the sulfur shown in the above formulation at a temperature of 60° to 70° C. After kneading, the resulting rubber composition was vulcanized at 160° C. for 40 minutes by use of a vulcanization press and then subjected to the following tests.

Determination of tan δ

Tan δ was determined at 60° C., 20° C. and −20° C. under conditions of an initial static strain of 10%, a dynamic strain amplitude of 0.5% and a frequency of 10 Hz, using a viscoelasticity spectrometer manufactured by Iwamoto Seisakusho Co. The value of tan δ at 60° C. corresponds to the rolling resistance; a smaller tan δ value means a larger improvement in lowering the rolling resistance. On the other hand, the value of tan δ at 20° C. corresponds to the wet-gripping property, and the value of tan δ at −20° C. corresponds to the ice-gripping property. A greater value of tan δ at 20° C. and −20° C. means a greater effect of improving the wet- and ice-gripping properties.

Tensile Test according to JIS K 6301

Test pieces (dumbbell No. 3) of vulcanized rubbers were prepared from the above rubber compositions. The test pieces were subjected to a tensile test at a room temperature to determine their tensile strength and tensile stress (M$_{300}$).

Test results obtained are shown in Table 3, together with the kinds and quantity of the azodicarboxylic ester used.

TABLE 3

(Results of Example 3)

| | | Invention | | | | Control Samples for Comparison | | | | |
|---|---|---|---|---|---|---|---|---|---|---|
| Run No. | | 1 | 2 | 3 | 4 | 5 | 6 | 7 | 8 | 9 |
| Azodicarboxylic | Kind | A | B | D | F | — | A | B | D | F |

TABLE 3-continued

|  |  | (Results of Example 3) | | | | | | | | |
|---|---|---|---|---|---|---|---|---|---|---|
|  |  | Invention | | | | Control Samples for Comparison | | | | |
|  | Run No. | 1 | 2 | 3 | 4 | 5 | 6 | 7 | 8 | 9 |
| Ester | Amount (parts) | 5 | 5 | 5 | 5 | — | 15 | 15 | 15 | 15 |
| Tan δ | −20° C. | 0.954 | 0.942 | 0.926 | 0.917 | 0.712 | 0.963 | 0.957 | 0.947 | 0.945 |
|  | 20° C. | 0.189 | 0.183 | 0.176 | 0.172 | 0.154 | 0.196 | 0.192 | 0.185 | 0.183 |
|  | 60° C. | 0.120 | 0.124 | 0.126 | 0.128 | 0.134 | 0.139 | 0.138 | 0.135 | 0.138 |
| Tensile Strength (kgf/cm$^2$) |  | 157 | 158 | 160 | 162 | 163 | 137 | 134 | 140 | 138 |
| M$_{300}$ (kgf/cm$^2$) |  | 146 | 147 | 148 | 149 | 151 | 118 | 120 | 124 | 126 |

EXAMPLE 4

(1) Synthesis of Tin-coupled Styrene/Butadiene Copolymer Rubber (SBR-2)

Under a nitrogen atmosphere, cyclohexane, 1,3-butadiene, tetrahydrofuran and styrene are charged into a reactor equipped with a stirrer and a jacket. After a temperature is adjusted to 30° C., n-butyl lithium is added to start polymerization. After the temperature is raised to 70° C., polymerization is carried out for 2 hours, so as to allow the polymerization conversion rate to reach 100%. A small quantity of 1,3-butadiene is added to render the polymerization terminals to butadienyl anions, and a coupling reaction is allowed to proceed at 70° C. for 30 minutes with the addition of tin tetrachloride. To the copolymer solution obtained 2,6-di-tert-butyl-p-cresol is added, and then the solvent is removed by means of steam stripping. The resulting product is then dried on a heat roll of 110° C. to obtain a copolymer. The content of a styrene unit in the thus obtained copolymer and the content of a 1,2-structure in a butadiene unit are determined by using an infrared spectrophotometer. The ratio of a branched copolymer is determined by means of gel permeation chromatography (GPC), based on the relative height of peaks of molecular weight distribution.

A styrene/butadiene copolymer rubber (SBR-2) having a styrene unit content of 24%, a 1,2-structure content of 35% in a butadiene,unit and a Mooney viscosity of 55 ML$_{1+4}$(100° C.) and containing 38% of a branched copolymer was prepared in accordance with the above procedure.

(2) Production and Tests of Rubber Composition

The procedure described in paragraph (2) of Example 3 was repeated, except that SBR-2 obtained above was used as a styrene/butadiene copolymer rubber. Results of the tests are shown in Table 4, together with the kinds and amount of the azodicarboxylic esters used.

TABLE 4

|  |  | (Results of Example 4) | | | | | | | | |
|---|---|---|---|---|---|---|---|---|---|---|
|  |  | Invention | | | | Control Samples for Comparison | | | | |
|  | Run No. | 1 | 2 | 3 | 4 | 5 | 6 | 7 | 8 | 9 |
| Azodicarboxylic Ester | Kind | A | B | D | F | — | A | B | D | F |
|  | Amount (parts) | 5 | 5 | 5 | 5 | — | 15 | 15 | 15 | 15 |
| Tan δ | −20° C. | 0.797 | 0.784 | 0.774 | 0.771 | 0.557 | 0.804 | 0.793 | 0.789 | 0.785 |
|  | 20° C. | 0.204 | 0.196 | 0.189 | 0.183 | 0.162 | 0.213 | 0.205 | 0.201 | 0.197 |
|  | 60° C. | 0.106 | 0.114 | 0.112 | 0.113 | 0.122 | 0.128 | 0.129 | 0.126 | 0.124 |
| Tensile Strength (kgf/cm$^2$) |  | 179 | 180 | 177 | 179 | 186 | 157 | 154 | 157 | 159 |
| M$_{300}$ (kgf/cm$^2$) |  | 87 | 88 | 86 | 87 | 91 | 67 | 63 | 69 | 71 |

EXAMPLE 5

| [Compounding Formulation] | Parts |
|---|---|
| Styrene/butadiene copolymer rubber prepared by emulsion polymerization (having a styrene unit content of 35% and a 1,2-structure content of 25% in a butadiene unit and containing 37.5 parts of aromatic oil per 100 parts of the rubber) | 137.5 |
| ISAF carbon black (having an N$_2$SA of 126 m$^2$/g an a DBP absorption number of 114 ml/100 g) | 90 |
| Stearic acid | 3 |
| Zinc oxide | 2 |
| Aromatic process oil | 12.5 |
| Antioxidant (N-phenyl-N'-1,3-dimethylbutyl-p-phenylenediamine) | 1 |
| Vulcanization accelerator (N-tert-butyl-2-benzothiazylsulfenamide) | 1 |
| Sulfur | 2 |
| Azodicarboxylic ester | Shown in Table 5 |

The procedure described in paragraph (2) of Example 3 was repeated, except that the formulation was changed as above. Results of the tests are shown Table 5, together with the kinds and amount of the azodicarboxylic esters used.

TABLE 5

|  |  | (Results of Example 5) | | | | | | | | |
|---|---|---|---|---|---|---|---|---|---|---|
|  |  | Invention | | | | Control Samples for Comparison | | | | |
|  | Run No. | 1 | 2 | 3 | 4 | 5 | 6 | 7 | 8 | 9 |
| Azodicarboxylic Ester | Kind | A | B | D | F | — | A | B | D | F |
|  | Amount (parts) | 5 | 5 | 5 | 5 | — | 15 | 15 | 15 | 15 |
| Tan δ | −20° C. | 1.004 | 0.996 | 0.975 | 0.956 | 0.744 | 1.023 | 1.001 | 0.980 | 0.967 |
|  | 20° C. | 0.354 | 0.347 | 0.337 | 0.327 | 0.305 | 0.361 | 0.354 | 0.342 | 0.338 |
|  | 60° C. | 0.199 | 0.207 | 0.205 | 0.211 | 0.220 | 0.231 | 0.228 | 0.227 | 0.226 |
| Tensile Strength (kgf/cm$^2$) |  | 157 | 160 | 162 | 167 | 168 | 143 | 146 | 149 | 147 |

TABLE 5-continued

| | (Results of Example 5) | | | | | | | | |
|---|---|---|---|---|---|---|---|---|---|
| | Invention | | | | Control Samples for Comparison | | | | |
| Run No. | 1 | 2 | 3 | 4 | 5 | 6 | 7 | 8 | 9 |
| $M_{300}$ (kgf/cm$^2$) | 70 | 74 | 72 | 75 | 77 | 57 | 58 | 60 | 59 |

When a particular azodicarboxylic ester, a particular carbon black, sulfur and a benzothiazole vulcanization accelerator are compounded with a styrene/butadiene copolymer rubber at a rubber processing step in accordance with the invention, the braking performance of a tire driving on a wet road surface or on a snow-covered or frozen road surface (wet-gripping property and ice-gripping property) can be improved and, at the same time, the rolling resistance can be lowered. Further the compounded composition is not deteriorated in mechanical properties of vulcanized rubber. Therefore, the rubber composition according to the invention, when applied to an automobile tire, in particular to the tread thereof, enables the production of a tire which is excellent not only in its gripping properties, which are closely related to the acceleration and braking performance of automobiles on the wet road surfaces and on the snow-covered or frozen surfaces, but also in fuel consumption.

What is claimed is:

1. A rubber composition which comprises:
   (A) 100 parts by weight of a rubber component comprising at least 50% by weight of a styrene/butadiene copolymer rubber;
   (B) 1 to 6 parts by weight of an azodicarboxylic ester compound represented by the formula (I):

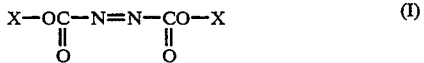

wherein X is an alkyl of 3 to 8 carbon atoms, an unsubstituted or substituted phenyl, or an unsubstituted or substituted benzyl;
   (C) 60 to 250 parts by weight of carbon black having a nitrogen absorption specific surface area of 100 to 250 m$^2$/g and a dibutyl phthalate absorption number of 110 to 170 ml/100 g;
   (D) 0.5 to 4 parts by weight of sulfur; and
   (E) 0.3 to 3 parts by weight of a benzothiazole vulcanization accelerator;
   said components (B) through (E) being incorporated into said rubber component by a rubber processing machine.

2. The rubber composition of claim 1, wherein said rubber component comprises at least 50% by weight of a styrene/butadiene copolymer rubber having a styrene unit of 10 to 50% by weight based on the weight of the copolymer rubber and a 1,2-structure of 20 to 80% by weight in a butadiene unit.

3. The rubber composition of claim 2, wherein said styrene unit is 30 to 50% by weight based on the weight of the copolymer rubber.

4. The rubber composition of claim 1, wherein said rubber component comprises at least 50% by weight of a modified styrene/butadiene copolymer rubber prepared by introducing at the polymer end thereof a benzophenone compound represented by the formula (II):

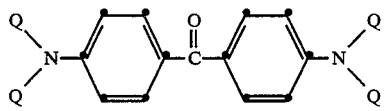

wherein Q is methyl or ethyl, and said styrene/butadiene copolymer rubber having:
   (A1) a styrene unit of 10 to 30% by weight and a butadiene unit of 90 to 70% by weight;
   (A2) a 1,2-structure of 20 to 80% by weight in the butadiene unit; and
   (A3) a Mooney viscosity of 30 to 80 indicated by $ML_{1+4}(100°\ C.)$.

5. The rubber composition of claim 1, wherein said rubber component comprises at least 50% by weight of a styrene/butadiene copolymer rubber coupled with tin or silicon and having:
   (A1) a styrene unit of 10 to 30% by weight and a butadiene unit of 90 to 70% by weight;
   (A2) a 1,2-structure of 20 to 80% by weight in the butadiene unit; and
   (A3) a Mooney viscosity of 30 to 80 indicated by $ML_{1+4}(100°\ C.)$.

6. The rubber composition of claim 1, wherein said rubber component consists essentially of the styrene/butadiene copolymer rubber.

7. The rubber composition of claim 1, wherein said rubber component comprises a blend of the styrene/butadiene copolymer rubber and another rubber selected from the group consisting of natural rubber, isoprene rubber and polybutadiene rubber.

8. The rubber composition of claim 1, wherein X in the formula (I) is an alkyl of 3 to 5 carbon atoms.

9. The rubber composition of claim 1, which further comprises a process oil.

10. An automobile tire prepared from the rubber composition of claim 1.

11. The automobile tire of claim 10, wherein said rubber composition is applied to a tread.

12. A process for producing a rubber composition which comprises:
   blending, by using a rubber processing machine, (A) 100 parts by weight of a rubber component comprising at least 50% by weight of a styrene/butadiene copolymer rubber at a rubber temperature of 50° to 190° C. with (B) 1 to 6 parts by weight of an azodicarboxylic ester compound represented by the formula (I):

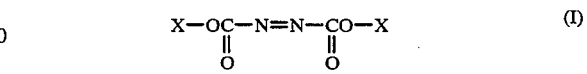

wherein X is an alkyl of 3 to 8 carbon atoms, an unsubstituted or substituted phenyl, or an unsubstituted or substituted benzyl, and (C) 60 to 250 parts by weight of carbon black having a nitrogen absorption specific surface area of 100 to 250 m$^2$/g and a dibutyl phthalate absorption number of 110 to 170 ml/100 g;

blending the resulting mixture at a rubber temperature of 10° to 120° C. with (D) 0.5 to 4 parts by weight of sulfur, and (E) 0.3 to 3 parts by weight of a benzothiazole vulcanization accelerator; and vulcanizing the resulting mixture.

13. A method for increasing a loss factor of a vulcanized rubber in a low temperature range of −20° to +30° C. as well as lowering the loss factor of the vulcanized rubber in a high temperature range of 50° to 80° C., said loss factor being determined by a dynamic viscoelasticity test with a frequency of 10 to 100 Hz, which method comprises:

blending, in a rubber processing step, (A) 100 parts by weight of a rubber component comprising at least 50% by weight of a styrene/butadiene copolymer rubber at a rubber temperature of 50° to 190° C. with (B) 1 to 6 parts by weight of an azodicarboxylic ester compound represented by the formula (I):

$$X-\underset{\underset{O}{\|}}{OC}-N=N-\underset{\underset{O}{\|}}{CO}-X \qquad (I)$$

wherein X is an alkyl of 3 to 8 carbon atoms, an unsubstituted or substituted phenyl, or an unsubstituted or substituted benzyl, and (C) 60 to 250 parts by weight of carbon black having a nitrogen absorption specific surface area of 100 to 250 m$^2$/g and a dibutyl phthalate absorption number of 110 to 170 ml/100 g;

blending the resulting mixture at a rubber temperature of 10° to 120° C. with (D) 0.5 to 4 parts by weight of sulfur, and (E) 0.3 to 3 parts by weight of a benzotriazole vulcanization accelerator; and vulcanizing the resulting mixture.

* * * * *

UNITED STATES PATENT AND TRADEMARK OFFICE
CERTIFICATE OF CORRECTION

PATENT NO. : 5,362,794
DATED : November 8, 1994
INVENTOR(S) : Naoki Inui, et. al.

It is certified that error appears in the above-indentified patent and that said Letters Patent is hereby corrected as shown below:

Title page, item [30]  Foreign Application Priority Data insert--

July 31, 1992 [JP]    Japan........ 205299/92--.
March 29, 1993 [JP]   Japan........ 69760/93--.

Signed and Sealed this

First Day of August, 1995

Attest:

BRUCE LEHMAN

Attesting Officer    Commissioner of Patents and Trademarks